United States Patent
Fujita et al.

(10) Patent No.: US 7,824,781 B2
(45) Date of Patent: Nov. 2, 2010

(54) METAL PHOSPHATE COMPOSITE AND DENSE MATERIAL COMPRISED OF THE SAME

(75) Inventors: Hiroki Fujita, Kasugai (JP); Yosuke Sato, Nagoya (JP); Yuki Bessho, Kitanagoya (JP)

(73) Assignee: NGK Insulators, Ltd., Aichi-Prefecture (JP)

( * ) Notice: Subject to any disclaimer, the term of this patent is extended or adjusted under 35 U.S.C. 154(b) by 183 days.

(21) Appl. No.: 12/171,496

(22) Filed: Jul. 11, 2008

(65) Prior Publication Data

US 2009/0022972 A1 Jan. 22, 2009

Related U.S. Application Data

(63) Continuation of application No. PCT/JP2007/051118, filed on Jan. 18, 2007.

(30) Foreign Application Priority Data

Jan. 18, 2006 (JP) ............................. 2006-010254

(51) Int. Cl.
 *B32B 9/00* (2006.01)
 *C01B 25/26* (2006.01)
 *C01B 25/36* (2006.01)

(52) U.S. Cl. ................... 428/697; 428/304.4; 428/220; 428/702; 428/704; 428/216; 423/305; 423/306

(58) Field of Classification Search .................. None
 See application file for complete search history.

(56) References Cited

OTHER PUBLICATIONS

Masahiro Nagao et al., "*MP$_2$O$_7$-Kei Kotai Denkaishitsu no Proton Dodensei to Sono Oyo*," Electrochemistry, The Electrochemical Society of Japan, Sep. 2005, vol. 73, No. 9, pp. 846-850.
Akihiko Takeuchi et al., "*An Intermediate-Temperature Fuel Cell Using In$^{3+}$-doped SnP$_2$O$_7$*" (*In Dope SnP2O7 Denkaishitsu ni Mochiita Chuon Sadogata Nenryo Denchi*), Denki Kagaku Shuki Taikai Koen Yoshishu, Sep. 8, 2005, vol. 2005, p. 42.
Akihiko Takeuchi et al., "*An Intermediate-Temperature Fuel Cell Using In$^{3+}$-doped SnP$_2$O$_7$ Electrolyte*," Dai 46 Kai Battery Symposium in Japan, Nov. 16, 2005, pp. 762-763.

*Primary Examiner*—Ling Xu
(74) *Attorney, Agent, or Firm*—Cermak Nakajima LLP; Tomoko Nakajima

(57) ABSTRACT

A metal phosphate composite having a composition represented by the formula $M1_xM2_{1-x}(H_wP_yO_z)$ (wherein M1 represents at least one element selected from the group consisting of tin, titanium, zirconium, silicon, and germanium, M2 represents an element having a valence of 3, and x, w, y, and z satisfy the following relationship, $0.5 \leq x < 1$, $0 \leq w$, $2 < y < 10$, and $0 < z < 35$).

20 Claims, 3 Drawing Sheets

FIG.1(a)
FIG.1(b)
FIG.1(c)
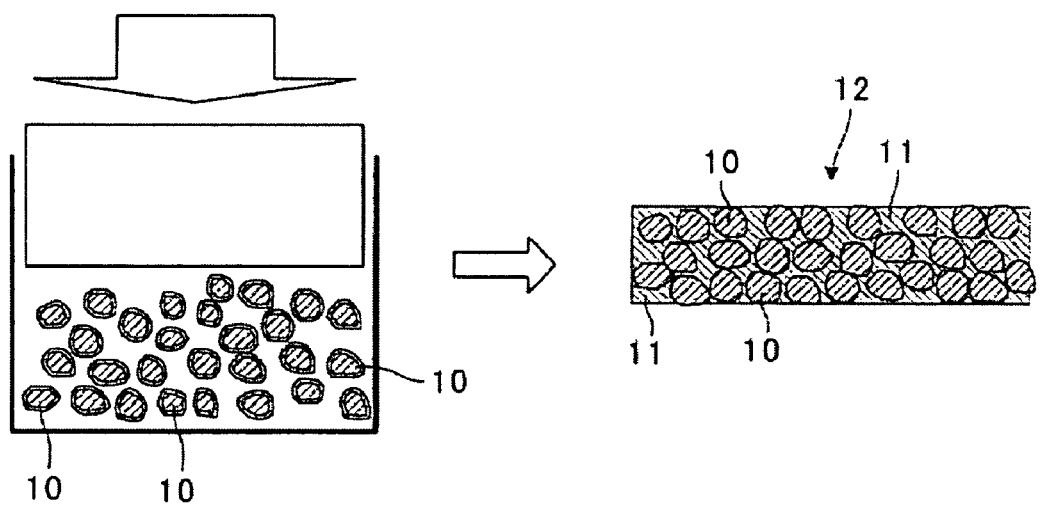
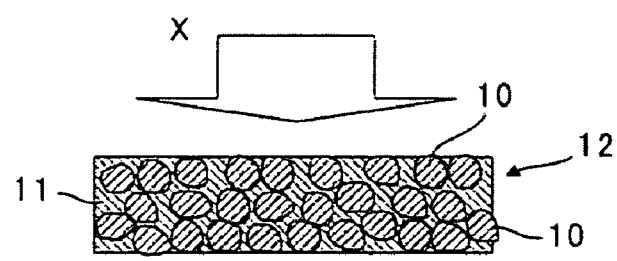

METAL PHOSPHATE COMPOSITE AND DENSE MATERIAL COMPRISED OF THE SAME

TECHNICAL FIELD

The present invention relates to a metal phosphate composite which is preferably used as a solid electrolyte for a fuel cell for a portable device, a movable body, a fixed instrument, and the like, and to a dense material comprised of the metal phosphate composite.

BACKGROUND ART

In recent years, a polymer electrolyte fuel cell (PEFC) using a polymer membrane represented by a membrane made of Nafion (manufactured by E.I. du Pont de Nemours and Company) has been investigated and developed as a fuel cell for a portable device, a movable body, a stationary instrument, and the like. These polymer membranes contain a large number of water molecules therein to exhibit sufficient proton conductivity necessary to operate as an electrolyte for fuel cells.

A problem with such a PEFC is a decrease in proton conductivity due to a decrease in the amount of water as a result of migration of water from an anode to a cathode, for example. The proton conductivity significantly decreases when a PEFC is operated at a temperature of 100° C. or more, at which water vaporization is abundant.

A method of reducing the thickness of the polymer membrane is used in order to control migration of water from an anode to a cathode or to reduce electrolyte resistance. However, reducing the membrane thickness causes a problem of permeation of raw material gas or liquid fuel. Because of the problem of water vaporization, the PEFC is operated at a temperature of 100° C. or less, usually about 80° C. At the same time, since it is necessary for the PEFC to correctly control the amount of water in the system, the system is prone to be complicated.

However, the following various problems have been pointed out when a PEFC is operated at a temperature of 100° C. or less.

(1) The electrode catalyst is poisoned by carbon monoxide contained in reforming hydrogen gas, which results in a decrease in catalytic activity.

(2) A large and complicated cooling device is required due to low heat exchange efficiency.

(3) A high output cannot be expected by operation in a low temperature region in which the chemical reaction efficiency is essentially low.

In order to overcome the problems associated with dry conditions without changing the basic technology and the application of PEFC and to raise the operating temperature as a means for solving the above problems (1) to (3), an electrolyte which operates at a high temperature of 150° C. or more in a no humid or low humid atmosphere is desired.

As candidate materials for these new solid electrolytes, porous glass, ammonium polyphosphate, cesium hydrogen sulfate, water-containing crystalline oxyacid, and the like have been proposed. None of these, however, exhibits high proton conductivity while satisfying the requirements of no humidity or low humidity operation at a high temperature.

Recently, inorganic and organic materials which exhibit high proton conductivity ($10^{-2}$ S·cm$^{-1}$ or more) at a mid-temperature in a range from 150 to 400° C. have been actively perused. One of the researches is a study on a metal phosphate shown by the formula $MP_2O_7$ (wherein M is a metal such as Si, Ge, Sn, or Ti) and a metal phosphate in which a portion of $Sn_4^+$ is doped with indium ($In_3^+$) ion to make a stoichiometric composition (see Non-patent Document 1). Although the proposed material has a possibility of being used as a proton conductor that can overcome the above-described problems in prior art, its electric conductivity is not yet sufficient and only a powdery sample has been obtained. As shown in FIG. 2, a formed body 2, which is obtained by press-forming a powder 1 of the metal phosphate $MP_2O_7$ mentioned above, may cause leakage R of a gaseous or liquid fuel X permeating through voids between the particles that form the formed body 2 or may cause cross-over of fuels if used as electrolyte.

[Non-patent Document 1] Electrochemistry, 73, pp. 846 to 850, No. 9 (2005), "4 Proton conductivity of $MP_2O_7$ solid electrolyte and application thereof"

SUMMARY OF THE INVENTION

The present invention was made in view of the above problems of the related art and has an object of providing a metal phosphate composite exhibiting high conductivity at a medium to high temperature of 100° C. or more, and more preferably 150° C. or more, and excellent gas or liquid blocking properties, being preferably used as a solid electrolyte, and providing a dense material comprising the metal phosphate composite.

As a result of extensive studies in order to achieve the above object, the present inventors have found that conductivity of a phosphate proton conductive material is increased if doped with indium, and that, if the ratio of P/(Sn+In) is larger than 2, an excess of phosphoric acid compound fills the voids of pellets produced by press-forming and suppresses leakage of gases and cross-over of fuels. This finding has led to the completion of the present invention.

That is, according to the present invention, there is provided a metal phosphate composite having a composition represented by the formula $M1_xM2_{1-x}(H_wP_yO_z)$ (wherein M1 represents at least one element selected from the group consisting of tin, titanium, zirconium, silicon, and germanium, M2 represents an element having a valence of 3, and x, w, y, and z satisfy the following relationship, $0.5 \leq x < 1$, $0 \leq w$, $2 < y < 10$, and $0 < z < 35$).

According to the present invention, there is also provided a metal phosphate composite comprising a metal phosphate having a composition represented by the formula $M1_xM2_{1-x}P_2O_7$ (wherein M1 represents at least one element selected from the group consisting of tin, titanium, zirconium, silicon, and germanium, M2 represents an element having a valence of 3, and x satisfies the relationship $0.5 \leq x < 1$), a phosphoric acid represented by the formula $H_aP_bO_c$ (wherein $0 \leq a$, $0 < b$, and $0 < c$), and/or a crystalline phosphate hydrate having a composition represented by the formula $M1(HPO_4)_2 \cdot nH_2O$ (wherein M1 represents at least one element selected from the group consisting of tin, titanium, zirconium, silicon, and germanium, and n is 1 or 2), wherein the ratio P/(M1+M2) of the number of atoms is larger than 2.

According to the present invention, there is further provided a metal phosphate composite prepared by mixing a phosphoric acid material, an M1-containing compound, and an M2-containing compound so that the ratio P/(M1+M2) of the number of atoms is larger than 2, and heating the mixture at a predetermined temperature (wherein M1 represents at least one element selected from the group consisting of tin, titanium, zirconium, silicon, and germanium, and M2 represents an element having a valence of 3).

In the metal phosphate composite of the present invention, y preferably satisfies $2 < y \leq 5$, and M2 is preferably indium.

Specifically, the phosphoric acid represented by the formula $H_aP_bO_c$ is preferably orthophosphoric acid ($H_3PO_4$), diphosphoric acid ($H_4P_2O_7$), triphosphoric acid ($H_5P_3O_{10}$), cyclotriphosphoric acid ($H_3P_3O_9$), peroxydiphosphoric acid ($H_4P_2O_8$), phosphorus pentaoxide ($P_2O_5$), or peroxyphosphoric acid ($H_3PO_5$).

The metal phosphate composite of the present invention is an excellent solid electrolyte having a high electric conductivity of 0.01 S/cm or more at 100 to 250° C.

According to the present invention, an almost pore-free dense material with a porosity of 10 vol % or less can be obtained by press-forming a powder of the above-mentioned metal phosphate composite into a predetermined shape. The dense material of the metal phosphate composite is preferably a material having very small pores with a maximum pore diameter of 1 nm or less therein.

A dense membrane of the metal phosphate composite with a thickness of 10 to 1000 μm can also be produced. The dense material and dense membrane exhibit high conductivity at a medium to high temperature of 100° C. or more, and particularly 150° C. or more, and excellent gas or liquid blocking properties and can preferably be used as a solid electrolyte.

According to the present invention, a dense material and a dense membrane exhibiting high conductivity at a medium to high temperature of 100° C. or more, excellent gas or liquid blocking properties, and being preferably used as a solid electrolyte, for example, can be provided.

BRIEF DESCRIPTION OF THE DRAWINGS

FIG. 1(a) is a schematic drawing showing an example of press-forming a powder of the metal phosphate composite of the present invention, FIG. 1(b) is a schematic drawing showing a dense material obtained by press-forming powder of the metal phosphate composite, and FIG. 1(c) is an explanatory diagram showing permeation of fuel.

DETAILED DESCRIPTION OF THE INVENTION

Figure 2:
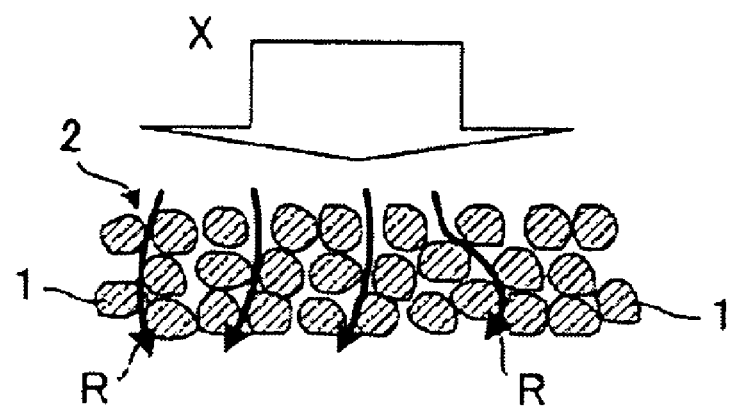
FIG. 2 is an explanatory diagram showing fuel permeation through a conventional product obtained by press-forming a powder of a general metal phosphate metal.

The best embodiments of the present invention are described below. Note that the present invention is not limited to the following embodiments. Various modifications and improvements may be made on the embodiments within the range of not deviating from the scope of the present invention based on the normal knowledge of a person skilled in the art.

The metal phosphate composite of the present invention has a composition of the formula $M1_xM2_{1-x}(H_wP_yO_z)$ M1 is tin, titanium, zirconium, silicon, or germanium, M2 is an element having a valence of 3, and x, w, y, and z satisfy the following relationship, $0.5 \leq x < 1$, $0 \leq w$, $2 < y < 10$, and $0 < z < 35$.

As a result of extensive studies on phosphate proton conductors from various points of view, it was found that a phosphate proton conductor doped with indium not only possesses improved conductivity, but also, if the ratio P/(Sn+In) is larger than 2, an excess phosphoric acid compound fills the voids of a formed body produced by press-forming to make the formed body dense and inhibits leakage of gases and liquid and suppresses cross-over of fuels.

Therefore, the metal phosphate composite in the present invention refers to a powdery product obtained by heating a raw material prepared so that the ratio P/(M1+M2) of the number of atoms is larger than 2 and has a composition of $M1_xM2_{1-x}(H_wP_yO_z)$. When the powder is press-formed, an excess phosphoric acid compound fills the voids of the formed body, and the body becomes dense.

This feature will be described more specifically with reference to FIGS. 1(a) to 1(c). As shown in FIG. 1(a), if a powder 10, which is obtained by heating a raw material having a composition of $M1_xM2_{1-x}(H_wP_yO_z)$ and prepared so that the ratio P/(M1+M2) of the number of atoms is larger than 2, is press-formed by a single-axis press machine or the like, a dense formed body 12 with almost no pores can be obtained as a result of filling the voids between the powders 10 with an excess phosphoric acid compound 11 as shown in FIG. 1(b). The dense formed body 12, therefore, can suppress permeation of a gaseous or liquid fuel X such as hydrogen or ethanol as shown in FIG. 1(c).

In the metal phosphate composite of the present invention, M1 in the composition of $M1_xM2_{1-x}(H_wP_yO_z)$ is at least one element selected from the group consisting of tin, titanium, zirconium, silicon, and germanium, and M2 is an element having a valence of 3. Among the above elements, tin is particularly preferable as M1, and indium is preferable as M2. The doping ratio (1−x) of M2 as a dorpant for M1 is a value satisfying the relationship of $0.5 \leq x < 1$, preferably $0.6 \leq x < 0.95$.

In addition, in the metal phosphate composite of the present invention, the ratio of phosphorus (P) to (M1+M2), [P/(M1+M2)], is preferably larger than 2 as indicated by the relationship $2 < y < 10$, and more preferably $2 < y \leq 5$. The composite contains hydrogen as indicated by the relationship $0 \leq w$ and also contains oxygen at a proportion satisfying the relationship $0 < z < 35$, and preferably $7 \leq z < 20$.

As another embodiment of the metal phosphate composite of the present invention, a composite comprising: a metal phosphate having a composition represented by the formula $M1_xM2_{1-x}P_2O_7$ (wherein M1 represents at least one element selected from the group consisting of tin, titanium, zirconium, silicon, and germanium, M2 represents an element having a valence of 3, and x satisfies the relationship $0.5 \leq x < 1$), a phosphoric acid $H_aP_bO_c$ (wherein $0 \leq a$, $0 < b$, and $0 < c$), and/or a crystalline phosphate hydrate having a composition represented by the formula $M1(HPO_4)_2 \cdot nH_2O$ (wherein M1 represents at least one element selected from the group consisting of tin, titanium, zirconium, silicon, and germanium, and n is 1 or 2), wherein the ratio P/(M1+M2) of the number of atoms is larger than 2, can be given.

There are three forms of the metal phosphate composite.

(1) A composite containing a metal phosphate having a composition of $M1_xM2_{1-x}P_2O_7$ and a phosphoric acid $H_aP_bO_c$.

(2) A composite containing a metal phosphate having a composition of $M1_xM2_{1-x}P_2O_7$ and a crystalline phosphate hydrate having a composition of $M1(HPO_4)_2 \cdot nH_2O$.

(3) A composite containing a metal phosphate having a composition of $M1_xM2_{1-x}P_2O_7$, a phosphoric acid $H_aP_bO_c$, and a crystalline phosphate hydrate having a composition of $M1(HPO_4)_2 \cdot nH_2O$.

As the phosphoric acid $H_aP_bO_c$, orthophosphoric acid ($H_3PO_4$), diphosphoric acid ($H_4P_2O_7$), triphosphoric acid ($H_5P_3O_{10}$), cyclotriphosphoric acid ($H_3P_3O_9$), peroxydiphosphoric acid ($H_4P_2O_8$), phosphorus pentaoxide ($P_2O_5$), and peroxyphosphoric acid ($H_3P_2O_5$) can be given. Of these, orthophosphoric acid and phosphorus pentaoxide are preferable.

The metal phosphate composite can be prepared by mixing a phosphoric acid material, an M1-containing compound (wherein M1 represents at least one element selected from the group consisting of tin, titanium, zirconium, silicon, and germanium) and an M2-containing compound (wherein M2 represents an element having a valence of 3), so that the ratio P/(M1+M2) of the number of atoms is larger than 2 and heating the mixture at a temperature from 200 to 700° C.

The metal phosphate composite of the present invention described above has a high electric conductivity of 0.01 S/cm or more, and preferably 0.02 S/cm or more at 100 to 250° C., and is excellent for use as a solid electrolyte, for example.

According to the present invention, an almost pore-free dense material with a porosity of 10 vol % or less can be obtained by press-forming the powder of the above-mentioned metal phosphate composite into a predetermined shape. In addition, a dense membrane with a thickness of 10 to 1000 μm can be produced by solidifying the metal phosphate composite powder which has very small pores with a maximum diameter of 1 nm among the aforementioned metal phosphate composite. The dense material and dense membrane exhibit high conductivity at a medium to high temperature of 100° C. or more, and particularly 150° C. or more, and excellent gas or liquid blocking properties. Such a dense material and dense membrane can preferably be used as a solid electrolyte.

The dense material and dense membrane can also preferably be used as an electrochemical cell, if provided with electrodes which possess catalytic functions and electron conductivity on both sides thereof. Such an electrochemical cell may be used as an electronic device for transferring protons from one electrode to the other electrode. The electrochemical cell may also effectively be used as a fuel cell having such an electronic device.

EXAMPLES

The present invention is described below in detail by way of examples. Note that the present invention is not limited to the following examples.

Example 1

Tin dioxide, diindium trioxide, and 85 wt % phosphoric acid were mixed so that Sn:In:P=0.9:0.1:2.5 (molar ratio). After adding an appropriate amount of water, the mixture was stirred while maintaining the temperature at 100° C. until all the water added has vaporized. The resulting product was treated with heat at 650° C. for two and a half hours to obtain a powder having a P/(Sn+In) ratio (molar ratio) of 2.5.

The resulting powdery material was ground in a mortar to obtain a fine powder with an average particle diameter of 1 μm. The fine powder thus obtained was formed using a single-axis press-forming machine at a pressure of 450 kgf/cm² to prepare a disc-like film with a diameter of 15 mm and a thickness of 1 mm. The relative density of the film calculated from the size and weight was 98.7%, and the porosity was 1.3%.

The pore diameter distribution was measured according to perm-porosimetry to confirm that there were no pores with a diameter of 1 nm or more.

An electrode was prepared by attaching platinum foils to both sides of the obtained disk-like film. Voltage and current terminals were attached to both sides of the electrode to measure the electric conductivity by the four-terminal AC impedance method. The measuring temperature was increased from room temperature to 250° C. while holding the sample in an atmosphere furnace. The resulting electric conductivity is shown in Table 1.

TABLE 1

| Electric conductivity of the sample | |
|---|---|
| Temperature (° C.) | Electric conductivity (S/cm) |
| 20 | 0.0095 |
| 100 | 0.034 |
| 150 | 0.058 |
| 180 | 0.081 |
| 200 | 0.092 |
| 230 | 0.096 |
| 250 | 0.086 |

The gas leakage of the disk-like film was evaluated as follows.

A pressure vessel of which the internal pressure is detectable was provided with a small circular window with a diameter of 10 mm. The above disk-like film was sufficiently sealed and attached to the window.

The pressure vessel was then filled with helium gas at a pressure of 5 atmospheres and allowed to stand for three hours.

As a result, the pressure reduction after three hours was found to be extremely small (0.1 kPa or less) showing that the disk-like film allowed almost no penetration of gas.

Comparative Example 1

Tin dioxide, diindium trioxide, and a 85 wt % aqueous solution of phosphoric acid were mixed so that Sn:In:P=0.9:0.1:1.8 (molar ratio). After adding an appropriate amount of water, the mixture was stirred at 10° C. until all the water added had vaporized. The resulting product was treated with heat at 650° C. for two and a half hours to obtain a powder having a P/(Sn+In) ratio (molar ratio) of 1.8.

Figure 3:
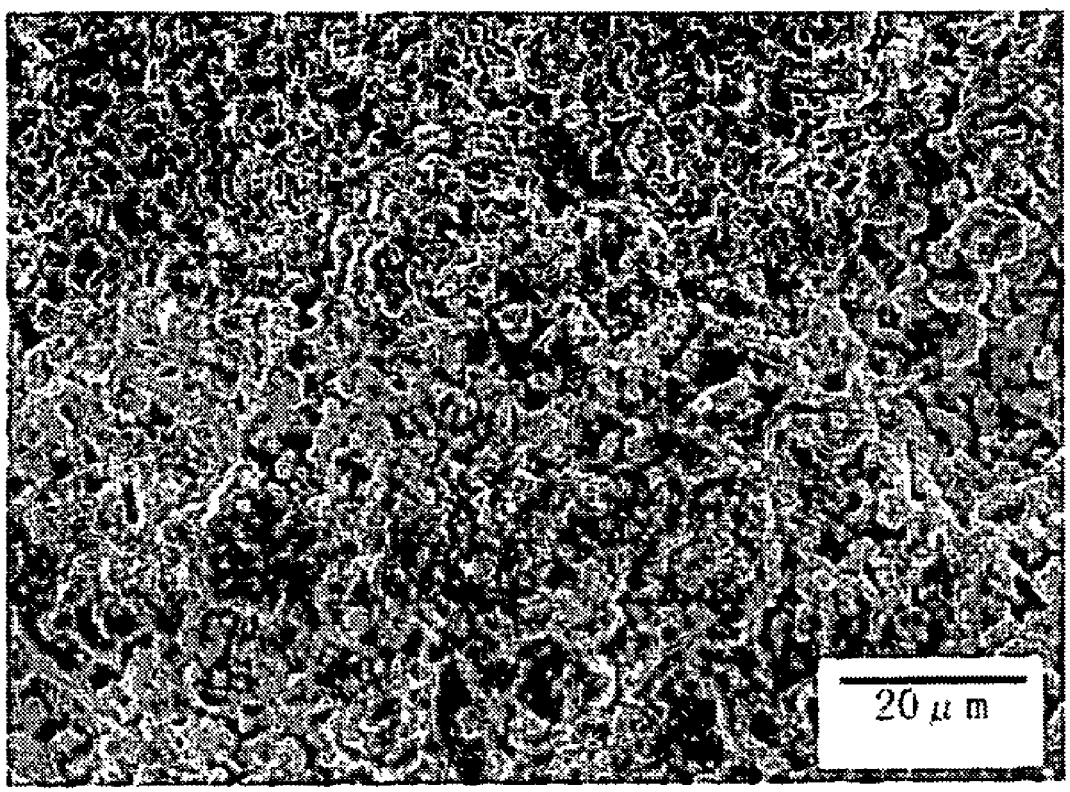
FIG. 3 is an SEM photograph of a broken plane of a disk-like membrane obtained in Comparative Example 1.

The resulting powdery material was ground in a mortar to obtain a fine powder. The fine powder thus obtained was formed using a single-axis press-forming machine at a pressure of 450 kgf/cm² to prepare a disk-like film with a diameter of 15 mm and a thickness of 1 mm. The relative density of the film calculated from the size and weight was about 60.5% and the porosity was 39.5%. An SEM photograph of a broken plane of the disk-like film is shown in FIG. 3. As shown in FIG. 3, there are many pores of a micrometer order inside the disk-like film, indicating that dense material as in Example 1 could not be obtained.

Comparative Example 2

Tin dioxide, diindium trioxide, and 85 wt % aqueous solution of phosphoric acid were mixed so that Sn:In:P=0.9:0.1:2.0 (molar ratio). After adding an appropriate amount of water, the mixture was stirred while maintaining the temperature at 100° C. until all the water added had vaporized. The resulting product was treated with heat at 650° C. for two and a half hours to obtain a powder having a P/(Sn+In) ratio (molar ratio) of 2.0.

The resulting powdery material was ground in a mortar to obtain a fine powder. The fine powder thus obtained was formed using a single-axis press-forming machine at a pressure of 450 kgf/cm² to prepare a disk-like film with a diameter of 15 mm and a thickness of 1 mm. The relative density of the film calculated from the size and weight was about 64.5%, and the porosity was 35.5%. The disk-like film was observed by SEM. As with the disk-like film obtained in Comparative Example 1 as shown in FIG. 3, there were many pores of a micrometer order inside the disk-like film, indicating that dense material as in Example 1 could not be obtained.

INDUSTRIAL APPLICABILITY

Since the metal phosphate composite and the dense material made therefrom of the present invention exhibit high conductivity at a medium to high temperature of 100° C. or more and excellent gas or liquid blocking properties, the metal phosphate composite and the dense material are preferably used as a solid electrolyte. Therefore, the metal phosphate composite and the dense material can suitably be used as an electrolyte material for fuel cells. A dense film made from the dense material can be used as an electrochemical cell and an electronic device if electrodes are provided.

EXPLANATION OF REFERENCE NUMERALS

1 Powdery sample of metal phosphate
2 Formed body
10 Powder of metal phosphate composite of the present invention
11 Excess phosphoric acid compound
12 Formed dense material

The invention claimed is:

1. A metal phosphate composite having a composition represented by the formula $M1_xM2_{1-x}(H_wP_yO_z)$ (wherein M1 represents at least one element selected from the group consisting of tin, titanium, zirconium, silicon, and germanium, M2 represents an element having a valence of 3, and x, w, y, and z satisfy the following relationship, $0.5 \leqq x < 1$, $0 \leqq w$, $2 < y < 10$, and $0 \leqq z \leqq 35$).

2. The metal phosphate composite according to claim 1, wherein y satisfies the relationship $2 < y \leqq 5$.

3. The metal phosphate composite according to claim 1, wherein M2 is indium.

4. The metal phosphate composite according to claim 1, the metal phosphate composite having an electric conductivity of 0.01 S/cm or more at 100 to 250.degree. C.

5. A dense material having a porosity of 10 vol % or less and greater than 0 vol % and obtained by press-forming a powder of the metal phosphate composite according to claim 1.

6. The dense material according to claim 5, the dense material being used as a solid electrolyte.

7. The metal phosphate composite according to claim 1, wherein the pores in the metal phosphate composite have a maximum diameter of 1 nm or less and greater than 0 vol %.

8. A dense material comprising the metal phosphate composite according to claim 7 and having a thickness of 10 to 1000 μm.

9. The dense material according to claim 8, the dense material being used as a solid electrolyte.

10. A metal phosphate composite comprising
a metal phosphate having a composition represented by the formula $M1_xM2_{1-x}P_2O_7$ (wherein M1 represents at least one element selected from the group consisting of tin, titanium, zirconium, silicon, and germanium, M2 represents an element having a valence of 3, and x satisfies the relationship $0.5 \leqq x < 1$), and any one of
a phosphoric acid represented by the formula $H_aP_bO_c$ (wherein $0 \leqq a$, $0 < b$, and $0 < c$),
a crystalline phosphate hydrate having a composition represented by the formula $M1(HPO_4)_2 \cdot nH_2O$ (wherein M1 represents at least one element selected from the group consisting of tin, titanium, zirconium, silicon, and germanium, and n is 1 or 2), and
combination thereof,
wherein the ratio P/(M1+M2) of the number of atoms contained in the complex is larger than 2.

11. The metal phosphate composite according to claim 10, wherein the phosphoric acid represented by the formula $H_aP_bO_c$ is orthophosphoric acid ($H_3PO_4$), diphosphoric acid ($H_4P_2O_7$), triphosphoric acid ($H_5P_3O_{10}$), cyclotriphosphoric acid ($H_3P_3O_9$), peroxydiphosphoric acid ($H_4P_2O_8$), phosphorus pentaoxide ($P_2O_5$), or peroxyphosphoric acid ($H_3PO_5$).

12. The metal phosphate composite according to claim 10, wherein M2 is indium.

13. The metal phosphate composite according to claim 10, the metal phosphate composite having an electric conductivity of 0.01 S/cm or more at 100 to 250.degree. C.

14. A dense material having a porosity of 10 vol % or less and greater than 0 vol % and obtained by press-forming a powder of the metal phosphate composite according to claim 10.

15. The metal phosphate composite according to claim 10, wherein the pores in the metal phosphate composite have a maximum diameter of 1 nm or less and greater than 0 nm.

16. A metal phosphate composite prepared by mixing a phosphoric acid material, an M1-containing compound (wherein M1 represents at least one element selected from the group consisting of tin, titanium, zirconium, silicon, and germanium), and an M2-containing compound (wherein M2 represents an element having a valence of 3) so that the ratio P/(M1+M2) of the number of atoms is larger than 2, and heating the mixture at a predetermined temperature.

17. The metal phosphate composite according to claim 16, wherein M2 is indium.

18. The metal phosphate composite according to claim 16, the metal phosphate composite having an electric conductivity of 0.01 S/cm or more at 100 to 250.degree. C.

19. A dense material having a porosity of 10 vol % or less and greater than 0 vol % and obtained by press-forming a powder of the metal phosphate composite according to claim 16.

20. The metal phosphate composite according to claim 16, wherein the pores in the metal phosphate composite have a maximum diameter of 1 nm or less and greater than 0 nm.

* * * * *